United States Patent

Schott

[15] 3,643,248
[45] Feb. 15, 1972

[54] WARNING SYSTEM FOR INDICATING FAILURE OF ELECTRICAL CIRCUITS

[72] Inventor: Lawrence A. Schott, 15940 Warwick, Detroit, Mich. 48223

[22] Filed: Oct. 31, 1969

[21] Appl. No.: 873,010

Related U.S. Application Data

[60] Continuation-in-part of Ser. No. 814,359, Apr. 8, 1969.

[52] U.S. Cl. .......................340/253 B, 340/52 R, 340/251, 335/151
[51] Int. Cl. ....................G08b 21/00, B60q 1/24, B60q 1/04
[58] Field of Search ..............340/251, 69, 52; 335/151, 152, 335/154, 196

[56] References Cited

UNITED STATES PATENTS

| | | | |
|---|---|---|---|
| 1,945,528 | 2/1934 | Gordon | 340/251 UX |
| 1,972,514 | 9/1934 | Engelaard et al. | 340/251 UX |
| 3,070,677 | 12/1962 | Lowry | 335/196 X |
| 3,171,096 | 2/1965 | Murray et al. | 340/69 |

*Primary Examiner*—John W. Caldwell
*Assistant Examiner*—Daniel Myer
*Attorney*—Hauke, Gifford and Patalidis

[57] ABSTRACT

A warning system for vehicles such as automobiles and the like, to indicate when one of at least two lamps of the vehicle is inoperative. In a preferred embodiment of the present invention a dual winding coil is disposed in separate circuits connecting a pair of electrical lamps to a source of electrical energy. One of the dual windings of the coil connected in one circuit creates an electromagnetic field and the other winding in the other circuit creates an electromagnetic field cancelling the first field. A warning device such as an indicator electrical bulb, for example, positioned proximate the operator of the vehicle, is connected to the source of electrical energy by a switching device disposed within the coil. The switching device comprises a pair of movable contact members normally maintained in open position and adapted to engage one another to connect the indicator bulb to the source of electrical energy in response to an electromagnetic field. Thus, when both lamps are operative the two electromagnetic fields cancel one another and the switching device remains open. When current flows through one winding of the coil changes due to a lamp failure, the electromagnetic field created by the remaining current flow closes the switching devices and thereby activates the warning device.

3 Claims, 6 Drawing Figures

FIG-3

PATENTED FEB 15 1972 3,643,248

INVENTOR
LAWRENCE A. SCHOTT
BY

Hauke Gifford & Patalidio
Attorneys

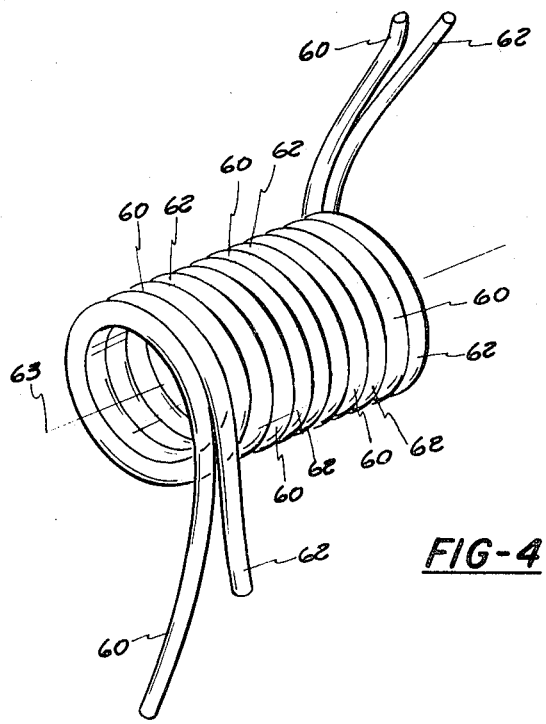
FIG-4
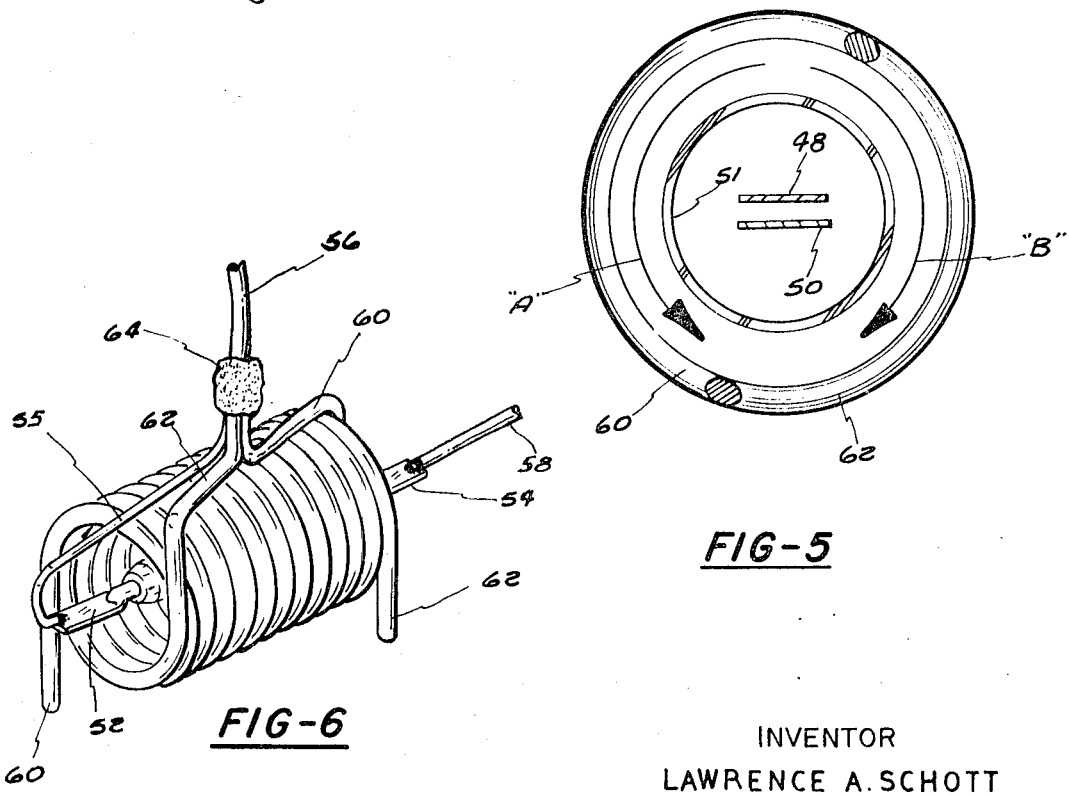
FIG-5
FIG-6
INVENTOR
LAWRENCE A. SCHOTT

WARNING SYSTEM FOR INDICATING FAILURE OF ELECTRICAL CIRCUITS

CROSS-REFERENCE TO RELATED APPLICATIONS

This application is a continuation-in-part of application Ser. No. 814,359, filed Apr. 8, 1969, entitled "Bulb Failure Warning Device."

BACKGROUND OF THE INVENTION

1. Field of the Invention

The present invention relates generally to a warning system which may be used in vehicles or the like to provide a warning signal to the operator indicating that one or more of the vehicle's electrical power utilization devices have failed.

2. Description of the Prior Art

Various devices have previously been proposed for detecting failures in electrical lightening systems in vehicles such as automobiles, motor trucks, motor buses, and the like, and for providing a warning to the operator of the vehicle. The electrical lighting system generally takes the form of an illuminating lamp, such as an automobile headlight, connected to a source of electrical energy, such as a battery. The failure detecting and warning device usually includes an electromagnetic relay provided with a coil developing a magnetic field as electrical current passes therethrough from the battery to the illuminating lamp. The armature of the electromagnetic relay generally forms a normally open switch in series between the battery and a warning light which is positioned within the interior of the vehicle in a position visible to the operator. When a failure in the main current flow path between the battery and the illuminating lamp occurs, the current ceases to pass through the electromagnetic relay and the magnetic field which was created by the passage of the electrical current therethrough ceases. Upon cessation of the magnetic field the normally open switch closes such that the warning light is turned on to indicate to the vehicle operator that a failure has occurred.

Although such circuits have functioned in an acceptable manner, they require a rather complex circuitry, numerous parts and are generally expensive and difficult to manufacture and are subject to failures. Specifically, each circuit which is adapted to designate one of the illuminating lamps carried by the vehicle requires an electromagnetic relay. Generally such electromagnetic relays include numerous parts such as a movable contact carried by an actuating arm, and adapted to engage a stationary contact which is secured by brackets and screws to the housing of the relay. Suitable installation is required to separate the contacts from the base. Spring means must be provided to urge the actuating arm and to maintain the movable and fixed contacts in a closed position. The armature itself which is generally carried by the housing is comprised of at least two coils, each of which has output terminals and input terminals, all of which adds to the overall cost and complexity of such systems. The overall expense and complexity in construction becomes even more evident when it is recognized that none of the prior art devices have attained any widespread commercial use in the automotive industry.

The manufacturers of motor vehicles, and particularly automobiles, motor trucks and buses, are continuously searching for ways to make motor vehicles safer and one obvious way of enhancing the safety of automobiles and other motor vehicles is to provide means to indicate to the operator thereof that all of the illuminating lamps, such as the headlights, taillights, brakelights, are functioning in a proper manner. It would therefore be desirable to provide a warning system for motor vehicles and the like which provides signaling means inside the vehicle to indicate to the operator thereof that one or more of the lights of the vehicles are not operating properly and to provide a system which can accomplish these results, but which is substantially inexpensive to manufacture and requires a minimal amount of components and circuitry over and above that which is already existing in the electrical circuitry of present motor vehicles.

SUMMARY OF THE INVENTION

The present invention which will be subsequently described in greater detail relates to a warning system for motor vehicles and the like for indicating when one of at least a pair of lamps of the vehicle is inoperative. Specifically, the invention is a warning system which has means for sensing the current flow delivered to the lamps of the vehicle and which will provide a warning signal should one or more of the lamps fail. One specific form of the novel warning system includes a dual winding coil having an equal number of turns of the input wires to a pair of lamps, as for example the input wires to the high- or low- beam lamps of a motor vehicle. The windings generate equal and opposite electromagnetic fields which cancel each other as electric current passes therethrough to the lamps. A switch responsive to an electromagnetic field is adapted to initiate the warning signal when current flowing in either of the windings changes. The warning system, which may take the form of an indicator light or buzzer which is positioned proximate the operator of the vehicle, indicates to the operator that one or more of the lights of the vehicle are not operating properly.

It is also an object of the present invention to provide a warning system which is reliable, inexpensive to manufacture and utilizes substantially fewer elements than in the herebefore described devices.

Other objects, advantages and applications of the present invention will become apparent to those skilled to the art when the accompanying description of one example of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts, and in which:

FIG. 4 is a perspective view illustrating the construction of a coil used in the present invention;

FIG. 5 is a sectional view of the coil shown in the several FIGURES to illustrate the flow of the current therethrough; and FIG. 6 is a perspective view of one example of the present invention.

DESCRIPTION OF THE PREFERRED EMBODIMENT

Figure 3:
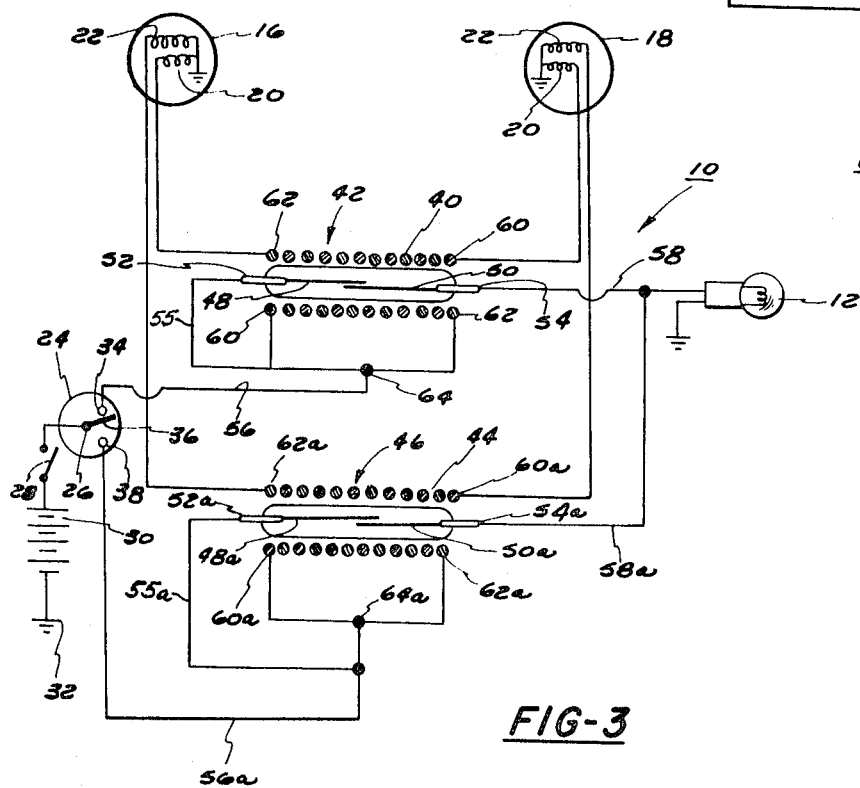
FIG. 3 is a diagrammatic illustration of the present invention incorporated in an automotive electrical circuit for indicating whether the headlights thereof are in proper functioning order.

Referring now to the drawings and especially FIG. 3 for a detailed description of one example of the invention, a warning system generally indicated by the numeral 10, includes an indicator light 12 which is operable to indicate whether or not illuminating lamps 16 and 18 are operating. The illuminating lamps 16 and 18, as herein shown, are automotive headlamps, each having a low-beam filament 20 and a high-beam filament 22. More specifically, as will be more clearly understood hereinafter, the circuit is operable so that the indicator light 12 is energized when either of the low- or high-beam filaments 20, 22 of either lamp 16 or 18 is inoperative due to the burning out of one of the filaments 20 or 22.

The circuit includes a switch 24, which is representative of the conventional foot operated switches utilized in automobiles to control the high- and low-beam operation of automotive headlamps. The switch 24 has a common terminal 26 which is connected through an on-off main switch 28 to a terminal of the vehicle's battery 30, whose other terminal is grounded as indicated at 32. The common terminal 26 of switch 24 may be selectively connected to either one of two stationary contacts 34, and 38 by way of a movable contact 36. When the movable contact 36 of the switch engages the stationary contact 34 as shown in FIG. 3, electrical current passes through the switch 24 to the low-beam filament 20 of both lamps 16 and 18 through the coil 40 of an electromagnetic switch 42, all of which will be described in greater detail hereinafter. When the movable contact 36 is positioned to engage the stationary contact 38, electrical current flows through the switch 24 to the high-beam filaments 22 of the lamps 16 and 18 through the coils 44 of a second electromagnetic switch 46, which likewise will be described in greater detail hereinafter.

Referring now to FIGS. 1, 4, 5 and 6 for a detailed description of the electromagnetic switch, 42 or 46, it will be appreciated that the electromagnetic switches 42 and 46 of FIG. 3 are structurally identical. Each electromagnetic switch comprises coil 40 which surrounds a pair of reedlike movable contacts 48 and 50 disposed in a glass enclosure 51. The contacts 48 and 50 are disposed along the longitudinal axis of the coil 40 with two terminals 52 and 54 extending externally of the glass enclosure 51 and respectively connected to movable contact 48 and to movable contact 50. The terminal 52 is connected by a lead wire 55 to a junction 64 and to the stationary contact 34 of the switch 24 by a lead wire 56 (FIG. 3). The other terminal 54 is connected to the indicator light 12 by a lead wire 58. The reedlike movable contacts 48 and 50 of the electromagnetic switch are normally in an open position to prevent the passage of current between the battery 30 and the indicator light 12 and are adapted to engage each other to close the circuit connecting the battery 30 and the lamp 12 when subjected to a magnetic force by being made of an appropriate material, such as steel for example, which is deflected when subjected to a magnetic field.

Figure 1:
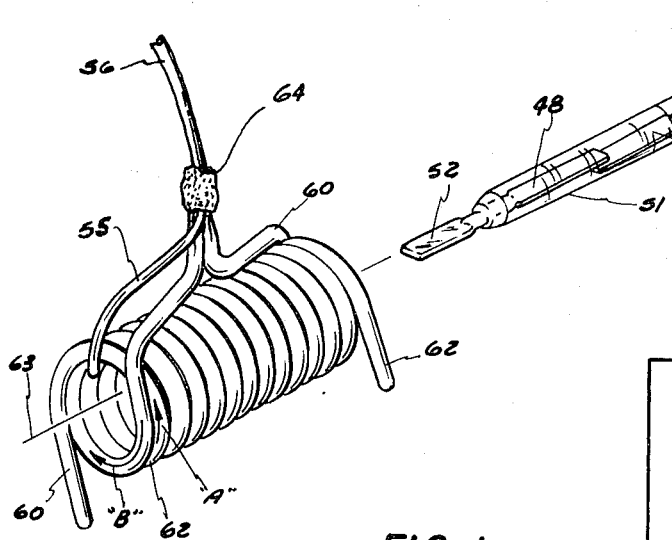
FIG. 1 is a exploded perspective view of one example of the present invention.

The coil 40 is formed by winding two wires 60 and 62, FIGS. 1 and 4, about a common axis 63 such that the wires 60 and 62 are in a side by side relationship, each wire 60 and 62 occupying successive turns of the coil. The wires 60 and 62 are wound about the common axis 63 the same number of times so that there are an equal number of ampere turns for each wire 60 and 62. When the current flow through each wire is different, the wires 60 and 62 may be wound an unequal number of times to create two equal and opposite magnetic fields.

The lead wire 56 is connected to one end of each of the coil wires 60 and 62 at the junction 64. Thus, the current being transmitted into the coil 40 from the lead wire 56 will be directed such that the current will flow through the wires 60 and 62 in opposite directions, as illustrated in FIGS. 1 and 5 by the arrows designated "A" and "B." The output ends of the wires 60 and 62 are respectively connected to the low-beam filaments 20 of the lamps 16 and 18. Thus the electrical current to the filaments 20 of the lamps 16 and 18 is directed along flow paths through the coil 40, which as viewed from the left side of FIG. 1 are in clockwise and counterclockwise directions around the electromagnetic switch contacts 48 and 50. Since the low-beam filaments 20 will each draw equal amounts of current, the wires 60 and 62 of the coil 40 will generate equal and opposite magnetic fields when the movable contact 36 of the switch 24 is connected to the stationary contact 34. Since the magnetic fields are equal and opposite, they will cancel one another and the contacts 48 and 50 of the electromagnetic switch 48 will remain in an open position as the same are only responsive to engage when subjected to a magnetic field, as hereinbefore described. In the event one of the low-beam filaments 20 burns out or otherwise fails, the current passing through that portion of the coil associated with the burned out filament ceases and the magnetic field associated with that portion of the coil likewise ceases. The remaining magnetic field acts upon the movable contacts 48 and 50 to cause the same to engage, thus closing the circuit between the battery 30 and the indicator light 12 to light the same and indicate to the operator of the vehicle that one of the lamp filaments has failed.

The electromagnetic switch 46 is identical to hereinbefore described switch 42 having an input lead 56a connected to the stationary switch 38 of the switch 24. When the movable contact 36 engages the stationary contact 38, current is transmitted through the lead 56a to the juncture 64a and through the wound coil 44 in opposite directions through wound wires 60a and 62a so as to create two equal and opposite magnetic fields which cancel each other, whereby the movable contacts 48a and 50a remain in open position so as to prevent an electrical connection between the battery 30 and the indicator light 12. The output of the coil wires 60a and 62a are respectively connected to the high-beam filaments 22 of the lamps 16 and 18. In the event of a failure of one of the high-beam filaments 22, the flow of current through one of the coil wires 60a or 62a will cease, and the remaining electromagnetic field will cause the movable contacts 48a and 50 to engage so as to complete the circuit between the battery 30 and the indicator light 12 to light the same and indicate to the driver of the vehicle that one of the lamp filaments has failed.

Figure 2:
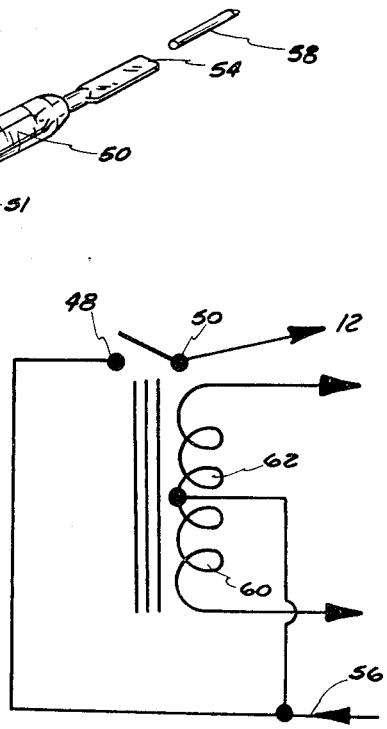
FIG. 2 is a diagrammatic illustration of the present invention in its simplest form.

FIG. 2 diagrammatically illustrates the invention in its simplest form as having a power input at 56 connected to both the two coil wires 60 and 62 of the coil 40 and the movable contacts 48 and 50. The output of the contact 50 is connected to an indicating means 12 while the outputs of the coil wires 60 and 62 are connected to a power utilization means such as the headlights of a motor vehicle. In the preferred embodiment, the wires 60 and 62 are of the same wire gauge and are wound along a common axis forming a coil of a uniform diameter and having the same number of turns for each of the wires 60 and 62. Such a construction is adapted to be used in conjunction with two power utilization devices each of which draws an equal amount of current, such as the low-beam filaments 20 or the high-beam filaments 22. Since each device draws an equal amount of current and the coils formed by the wires 60, 62 are identical, they will create equal and opposite magnetic fields which cancel one another.

Since the movement of the contacts 48 and 50 is dependent upon the equal and opposite magnetic fields, the warning device will function over a wide range of battery voltages which other devices, heretofore, were not capable of doing.

It should be noted however that two electrical power utilization means may be used in conjunction with one another, each of which draws a different amount of current. The magnetic fields created by the two different currents can be made equal and opposite by designing a coil having two wires each of which has a different numbers of turns. It should also be noted that the coil 40 may have any even number of wires associated with the contacts 48 and 50 to establish equal and opposite electromagnetic fields which function in the same manner as hereinbefore described.

Although the warning system of this invention is shown as having particular utility when used in conjunction with an automobile, it is not to be construed in a limiting sense as the present invention is adaptable for use whenever two or more power utilization means are being used, wherein it is desired to have indicating means, such as a light or buzzer, to warn the operator of the particular device whether one of the electrical power utilization means has failed.

Having thus described the invention, what is claimed is as follows:

1. An electrical circuit comprising a source of electrical energy, first and second power utilization means for respectively receiving current from said source, warning means responsive to electrical energy, normally open switching means for connecting said warning means to said source of electrical energy, said switching means being responsive to a magnetic field, and means forming first and second current paths for respectively transmitting said current to said first and second power utilization means, portions of said paths being disposed such as to create substantially equal magnetic fields substantially cancelling each other, said switching means being closed when said magnetic fields become unequal by a predetermined amount for turning on said warning means, wherein said current path portions form separate windings defining a coil surrounding said switching means, said coil being so formed that electrical current passes through each of said windings in opposite directions to provide substantially equal and opposite magnetic fields and wherein each of said windings is an electrical wire of a predetermined gauge, said coil being formed by alternate turns of said windings about a common axis such that each turn of one of said windings is adjacent to each turn of the second of said windings, each of said windings being connected in each of said current paths such that current normally flows in said paths in opposite directions, and wherein said switching means comprises a pair of movable contacts, one of which is connected to said electrical source and the other is connected to said warning means, said movable contacts being normally open and adapted to engage one another to close said switch in response to exposure to a magnetic field of a predetermined intensity.

2. The electrical circuit claimed in claim 1, wherein said coil is formed by an equal number of ampere turns of said first and second windings.

3. The electric circuit claimed in claim 1, wherein said warning means is an electrical illuminating lamp connected to said other movable contact, said lamp being energized when said movable contacts engage in response to a magnetic field.

* * * * *